US007980816B2

(12) United States Patent
Severin et al.

(10) Patent No.: US 7,980,816 B2
(45) Date of Patent: Jul. 19, 2011

(54) RETAINER FOR A TURBOCHARGER (75) Inventors: Emmanuel Severin, Thaon-les-Vosges (FR); Lorrain Sausse, Charmes (FR); Dufin Manuel, Epinal (FR); Pierre Barthelet, Remiremont (FR); Eric Boucher, Rambervillers (FR)

(73) Assignee: Honeywell International Inc., Morristown, NJ (US)

( * ) Notice: Subject to any disclaimer, the term of this patent is extended or adjusted under 35 U.S.C. 154(b) by 995 days.

(21) Appl. No.: 11/845,667

(22) Filed: Aug. 27, 2007

(65) Prior Publication Data
US 2009/0060726 A1 Mar. 5, 2009

(51) Int. Cl.
*F01D 25/24* (2006.01)
(52) U.S. Cl. ........ 415/163; 415/164; 415/165; 415/206; 415/213.1
(58) Field of Classification Search .................. 415/163, 415/164, 165, 206, 213.1
See application file for complete search history.

(56) References Cited

U.S. PATENT DOCUMENTS

| 4,654,941 A * | 4/1987 | Burdette et al. ........... 29/889.22 |
| 4,684,319 A * | 8/1987 | Sasaki ........................... 415/164 |
| 7,478,991 B2 * | 1/2009 | Noelle .......................... 415/159 |
| 7,559,199 B2 * | 7/2009 | Sausse et al. .................. 60/602 |
| 2008/0031728 A1 * | 2/2008 | Sausse et al. ................. 415/160 |

FOREIGN PATENT DOCUMENTS

| EP | 1642009 B1 | 5/2004 |
| WO | 2004/109063 A1 | 12/2004 |

* cited by examiner

*Primary Examiner* — Ninh H Nguyen
(74) *Attorney, Agent, or Firm* — Alston & Bird LLP (57) ABSTRACT Disclosed are retainers for a turbocharger. In one embodiment, the retainer includes a generally annular body that defines a bore and one or more channels. The bore is generally directed along a central axis of the body and can be configured to mate with a nose of a center housing of a turbocharger. The channels can be configured to accommodate vanes associated with a cartridge assembly of the turbocharger. One or more legs may extend from the retainer body and may be configured to mate with and locate the retainer relative to a cartridge assembly for the turbocharger. The retainer can also include a concave portion disposed around a perimeter of the body. The concave portion and the body may be together configured to act as a spring when the retainer is mechanically loaded in a direction having a component parallel to the central axis. Also disclosed are corresponding turbochargers.

24 Claims, 9 Drawing Sheets

RETAINER FOR A TURBOCHARGER

BACKGROUND INFORMATION

The present disclosure relates to turbocharger assemblies, and more particularly relates to methods and apparatuses for locating a cartridge assembly within a turbocharger.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

One of the challenges in boosting engine performance with a turbocharger is achieving a desired amount of engine power output throughout the entire operating range of the engine. It has been found that this objective is often not readily attainable with a fixed-geometry turbocharger, and hence variable-geometry turbochargers have been developed with the objective of providing a greater degree of control over the amount of boost provided by the turbocharger. One type of variable-geometry turbocharger is the variable-nozzle turbocharger (VNT), which includes an array of variable vanes in the turbine nozzle. The vanes are pivotally mounted in the nozzle and are connected to a mechanism that enables the setting angles of the vanes to be varied. The nozzle, vanes, and associated components are sometimes referred to collectively as the "cartridge assembly." Changing the setting angles of the vanes has the effect of changing the effective flow area in the turbine nozzle, and thus the flow of exhaust gas to the turbine wheel can be regulated by controlling the vane positions. In this manner, the power output of the turbine can be regulated, which allows engine power output to be controlled to a greater extent than is generally possible with a fixed-geometry turbocharger.

The cartridge assembly, and specifically the variable vane mechanism, is relatively complicated and thus presents a challenge in terms of assembly of the turbocharger. Furthermore, the mechanism is located between the turbine housing, which gets quite hot because of its exposure to exhaust gases, and the center housing, which is at a much lower temperature than the turbine housing. Accordingly, the variable vane mechanism is subject to thermal stresses because of this temperature gradient.

It is important that the cartridge assembly is accurately placed with respect to the other parts of the turbocharger, including the turbine housing, in order to assure that the various parts do not unintentionally come in contact through mechanical movement or thermal expansion. However, at present, placement of the cartridge assembly during assembly of the compressor is a difficult and sometimes inaccurate process. Thus, there exists a need for an improved apparatus and method for locating a cartridge assembly in a compressor.

BRIEF SUMMARY OF THE DISCLOSURE

Embodiments disclosed herein may address some of the above discussed disadvantages, while potentially providing other advantages, by providing a novel turbocharger and/or a cartridge assembly for a turbocharger. A turbocharger includes a retainer that aids in locating an associated cartridge assembly relative to the turbine and/or center housing of the turbocharger. The retainer may be configured to self-locate within the turbocharger during assembly by mating with one or more other components of the turbocharger, and may impart mechanical forces on the cartridge assembly in order to urge the cartridge assembly into a desired position.

One aspect of the disclosure is directed to a retainer for a turbocharger. The retainer includes a generally annular body that defines a bore and one or more channels. The bore is generally directed along a central axis of the body and can be configured to mate with a nose of a center housing of a turbocharger. The channels can be configured to accommodate vanes associated with a cartridge assembly of the turbocharger. The channels can be dispersed circumferentially around the retainer and each of the channels can extend through the retainer substantially parallel to the central axis.

One or more legs may extend from the retainer body and may be configured to mate with and locate the retainer relative to a cartridge assembly for the turbocharger. The legs may extend from the retainer in an overall direction that has a component substantially parallel to the central axis and has a component substantially perpendicular to the central axis. For example, the legs may include one or more arcuate legs configured to retain a unison ring of a cartridge assembly of a turbocharger. The arcuate legs may include adjacent first and second leg portions, the first leg portion extending substantially parallel to the central axis and the second leg portion extending substantially perpendicular to the central axis. Regardless of the shapes of the legs, each of the legs may be disposed at approximately the same radius with respect to the central axis.

In one embodiment, the channels defined by the annular body can include a first set of one or more channels circumferentially disposed at a first radius relative to the central axis and a second set of one or more channels circumferentially disposed at a second radius that is larger than the first radius. The legs can then extend from a portion of the retainer disposed between the first and second sets of channels and in a direction toward the second set of one or more channels.

The retainer can also include a concave portion disposed around a perimeter of the body. The concave portion and the body may be together configured to act as a spring when the retainer is mechanically loaded in a direction having a component parallel to the central axis. The retainer can further include an alignment protrusion extending from the retainer at least partially substantially parallel to the central axis. In some embodiments, one of the one or more legs may serve as the alignment protrusion.

Another aspect of the disclosure is also directed to a retainer for a turbocharger. The retainer includes an annular body generally defining a central axis. A concave portion can extend from the annular body and can be configured to act as a spring when the retainer is mechanically loaded in a direction having a component parallel to the central axis. A lip may be disposed around a perimeter of the annular body and may be configured to engage a center housing of the turbocharger.

Yet another aspect of the disclosure is directed to a turbocharger having a variable-nozzle turbine. The turbocharger includes a center housing having a nose, a turbine housing configured to house a turbine wheel and connected to the center housing, and a cartridge assembly retained between the center housing and the turbine housing. The cartridge assembly can include a generally annular nozzle ring, a substantially annular flange, and a retainer. The nozzle ring can have opposing first and second surfaces and can be coupled to an array of vanes circumferentially spaced about the nozzle ring such that exhaust gas flows between the vanes to the turbine wheel, each vane being rotatably mounted to the nozzle ring and connected to a rotatable unison ring via a vane arm such that rotation of the unison ring rotates the vanes for regulating exhaust gas flow to the turbine wheel. The flange can have a radially inner portion and a radially outer portion, the radially inner portion being adjacent to the first surface of the nozzle ring. The retainer can include a generally annular body defining a bore that is generally directed along a central axis of the body and can be configured to mate with the nose. The retainer can further define one or more channels configured to accommodate the vanes, the body being disposed between the vanes and the unison ring such that the vanes extend through the one or more channels to couple to the vane arms. One or more legs may extend from the body and may be configured to mate with and locate the retainer relative to the unison ring.

Still another aspect of the disclosure is directed to another turbocharger having a variable-nozzle turbine. The turbocharger can include connected center and turbine housings and a retainer. The turbine housing can be configured to house a turbine wheel. The cartridge assembly can be retained between the center housing and the turbine housing and can include a generally annular nozzle ring, a substantially annular flange, and a retainer. The nozzle ring can have opposing first and second surfaces and can be coupled to an array of rotatable vanes configured to regulate exhaust gas flow to the turbine wheel. The flange can have a radially inner portion and a radially outer portion, the radially inner portion being adjacent to the first surface of the nozzle ring. The retainer can include an annular body generally defining a central axis. A concave portion can extend from the annular body and can be disposed adjacent to the second surface of the nozzle ring in an area opposite the radially inner portion of the flange. A lip can be disposed around a perimeter of the annular body and can be configured to engage the center housing. The turbine housing can be connected to the center housing so as to compress therebetween the annular body and the radially outer portion of the flange, the nozzle ring being compressed between the radially inner portion of the flange and the concave portion. In this configuration, the concave portion may act as a spring in urging the nozzle ring against the radially inner portion of the flange.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
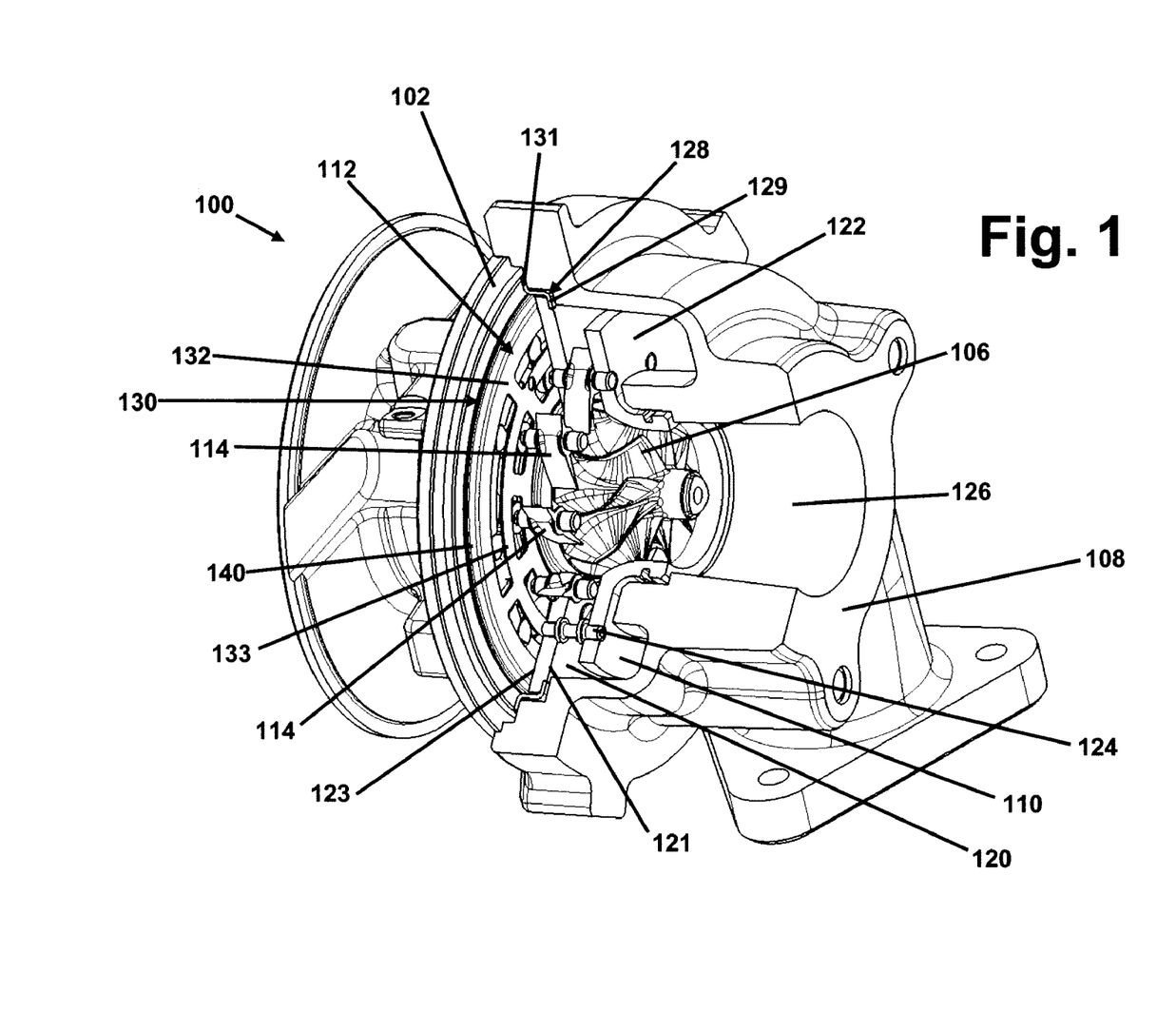
FIGS. 1 and 2 are fragmentary perspective views of a turbocharger, the turbocharger including a retainer configured in accordance with an exemplary embodiment.
Figure 2:
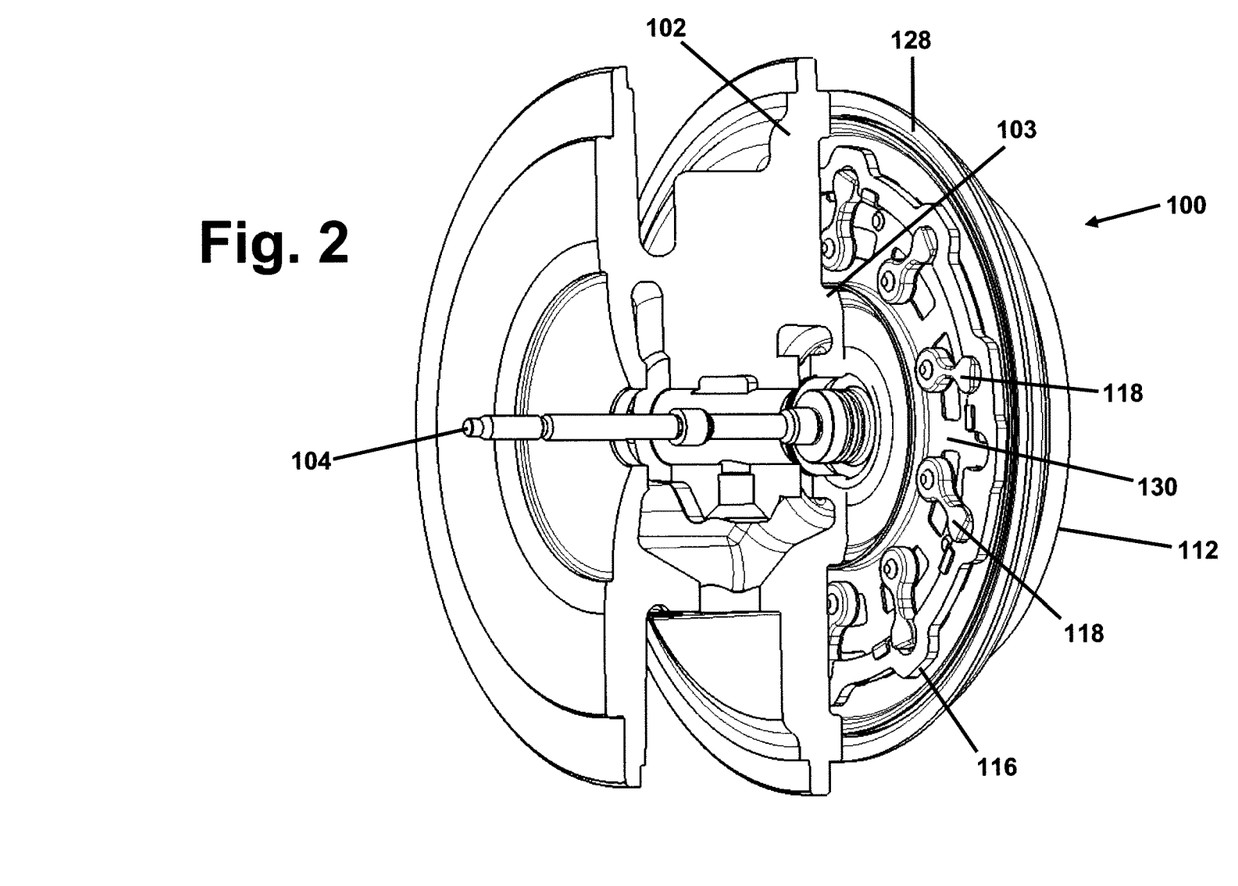

Referring to FIGS. 1 and 2, therein are shown fragmentary perspective views of a turbocharger 100 for use in conjunction with, for example, an engine, the turbocharger being configured in accordance with an exemplary embodiment. The turbocharger 100 can include a center housing 102 that rotatably supports a shaft 104. A turbine wheel 106 can be coupled to one end of the shaft 104 such that the turbine wheel and shaft rotate together. A turbine housing 108 can be coupled to the center housing 102. The turbine housing 108 can define a generally annular chamber 110 that surrounds the turbine wheel 106.

A cartridge assembly 112 can be disposed between the turbine housing 108 and center housing 102. The cartridge assembly 112 can include an array of vanes 114 that are coupled to a unison ring 116 via respective vane arms 118. The vanes 114 can be circumferentially spaced about and rotatably mounted to a generally annular nozzle ring 120, extending from the vane arms 118 through the nozzle ring and between the nozzle ring and a contour pipe 122. The nozzle ring 120 may include opposing first and second surfaces 121, 123. Spacers 124 serve to mechanically maintain the nozzle ring 120 and the contour pipe 122 at a specified separation distance. In this configuration, rotational movement of the unison ring 116 induces rotation of each of the vanes 114 so as to adjust the angular orientations of the vanes and thereby vary the cross-sectional flow area between the vanes.

During operation of the turbocharger 100, exhaust gases produced by the operation of an associated engine (not shown) can be fed (e.g., ducted) into the chamber 110 of the turbine housing 108. The exhaust gases are directed from the chamber 110 generally radially inwardly between the nozzle ring 120 and the contour pipe 122. The gases pass through the plurality of vanes 114 toward the turbine wheel 106, thereby driving the rotation of the turbine wheel and shaft 104. The gases subsequently exit the turbine housing 108 through a generally axial bore 126. The turbocharger 100 can also include a compressor (not shown) having a compressor wheel mounted to an opposing end of the shaft 104, such that the rotation of the turbine wheel 106 serves to drive the compressor wheel and invoke the operation of the compressor for boosting performance of the engine.

Referring to FIGS. 1-7, the cartridge assembly 112 can be retained between the turbine housing 108 and the center housing 102 by being compressed between a flange 128 and a retainer 130, the retainer being configured in accordance with an exemplary embodiment. For example, the flange 128 may include a radially inner portion 129 and a radially outer portion 131. When the flange is situated in an assembled turbocharger, the radially inner portion 129 may be adjacent to the first surface 121 of the nozzle ring 120 and may be opposed by the retainer 130 adjacent to the second surface 123. The radially outer portion 131 may be positioned so as to be compressed between the turbine housing 108 and the center housing 102. The retainer 130 can include a generally annular body 132 that defines a bore 134 along a central axis a. The bore 134 can include a radially inner surface 135 that can engage a nose 103 of the center housing 102 when the retainer 130 is assembled as part of a turbocharger. In some embodiments, the engagement of the radially inner surface 135 and the nose 103 may serve to locate the retainer 130 relative to the center housing 102.

The annular body 132 also can define one or more channels 136 configured to accommodate the vanes 114. For example, one or more of the channels 136 may be dispersed circumferentially around the retainer 130, with each of the channels extending through the retainer substantially parallel to the central axis a. Alternatively, the channels 136 may include a first set of channels 136a circumferentially disposed at a first radius relative to the central axis a and a second set of channels 136b circumferentially disposed at a second radius that is larger than the first radius. It is noted that in some embodiments, the flange 128 and retainer 130 may be integrated with and/or considered part of the cartridge assembly 112.

One or more legs 138 may extend from the annular body 132, with at least some of the legs being configured to mate with and locate the retainer 130 relative to the cartridge assembly 112. For example, the legs 138 may mate with the unison ring 116, with the vanes 114 and/or vane arms 118, or with some other portion of the cartridge assembly. One or more of the legs 138 may extend from the retainer 130 in an overall direction that has a component substantially parallel to the central axis a and a component substantially perpendicular to the central axis a. For example, one or more of the legs 138 may be arcuate and configured to retain the unison ring 116 of a cartridge assembly of a turbocharger. As a specific example of this, the arcuate legs 138 may include adjacent first and second leg portions 138a, 138b respectively extending substantially parallel to and substantially perpendicular to the central axis a, such that the leg generally forms an "L" shape. Overall, the shape of the legs 138 may facilitate the mating of the legs with the unison ring 116. Along these lines, each of the legs 138 may be disposed at approximately the same radius with respect to the central axis a.

In one embodiment in which the retainer 130 includes first and second sets of channels 136a, 136b, the legs 138 may extend from a portion 133 of the retainer disposed between the first and second sets of channels and in a direction toward the second set of channels. Further, the legs 138 may be circumferentially disposed around the annular body 132 at an angular frequency similar to or related to the angular frequency of the vanes 114. This may facilitate assembly of the retainer 130 and the cartridge assembly 112, as the legs 138 can pass through concavities 117 defined by the unison ring 116 and designed to ultimately capture the vane arms 118.

The retainer 130 may also include a concave portion 140 that can extend from the annular body 132, for example, from an outer perimeter of the annular body. The concave portion 140 may be configured such that the annular body 132 and concave portion together act as a spring when the retainer 130 is mechanically loaded in a direction having a component parallel to the central axis a. The retainer 130 may further include an alignment protrusion 141 extending from the retainer at least partially substantially parallel to the central axis a. In some cases, one or more of the legs 138 may serve as the alignment protrusion 141, for example, mating with a depression 142 or a circular groove in the center housing 102. Such mating may serve to constrain the rotational movement of the retainer 130.

Figure 8:
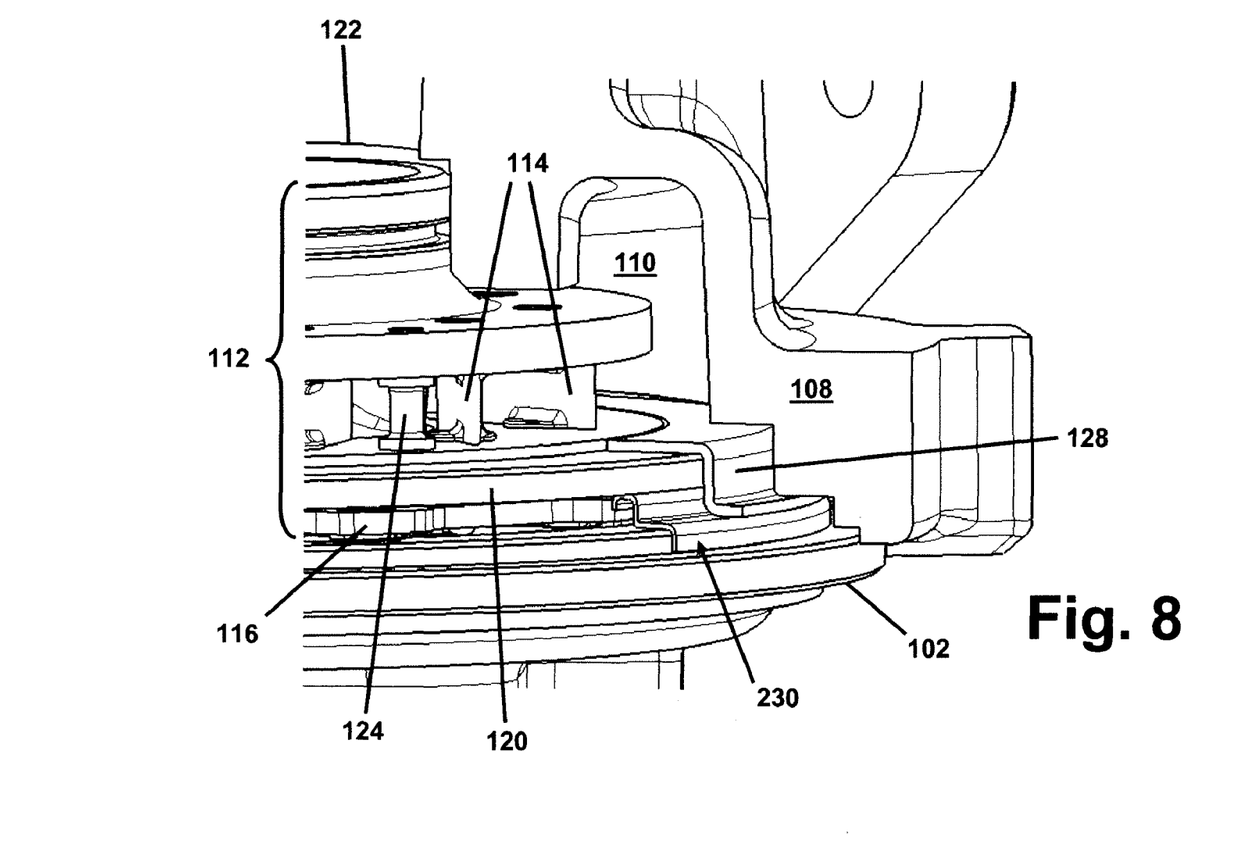
FIG. 8 is a fragmentary perspective view of a turbocharger, the turbocharger including a retainer configured in accordance with another exemplary embodiment.
Figure 9:
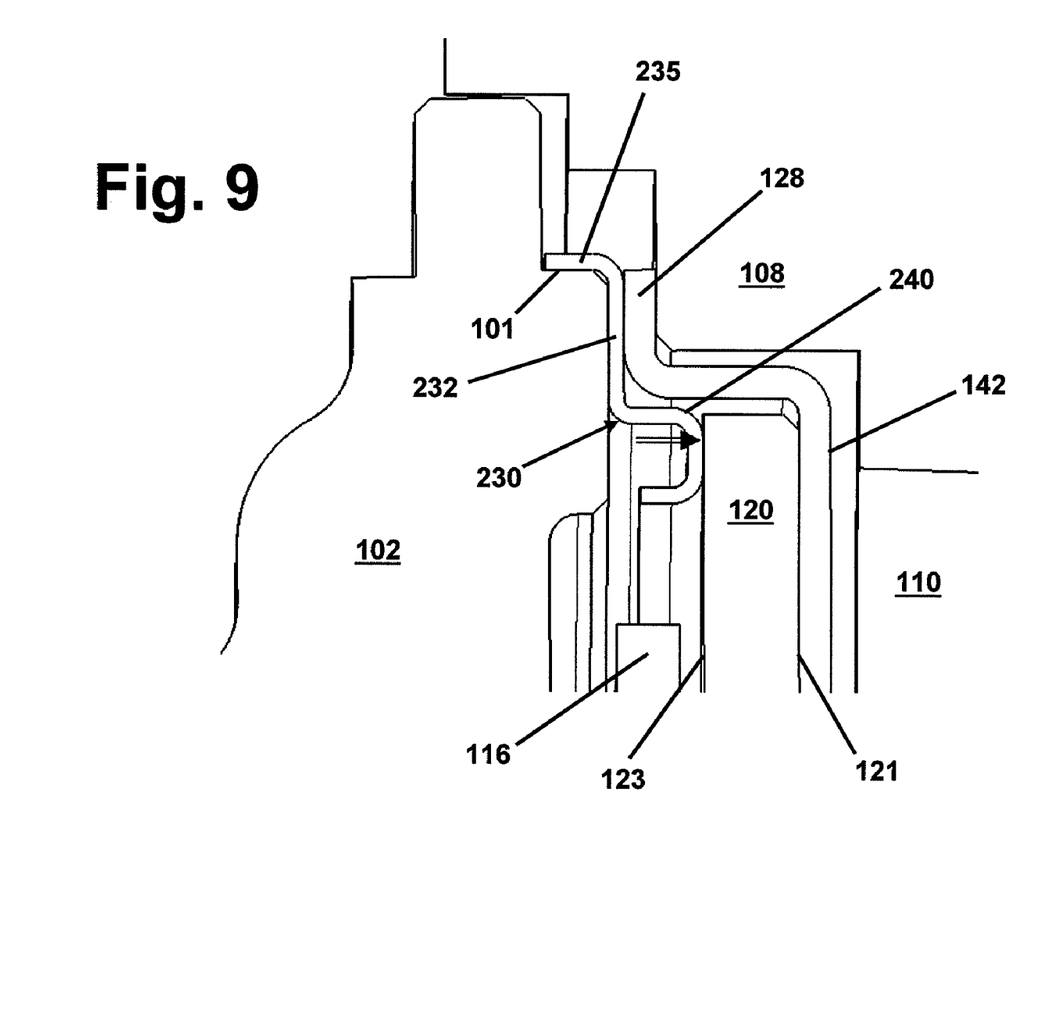
FIG. 9 is a cross sectional view of the turbocharger of FIG. 8.
Figure 10:
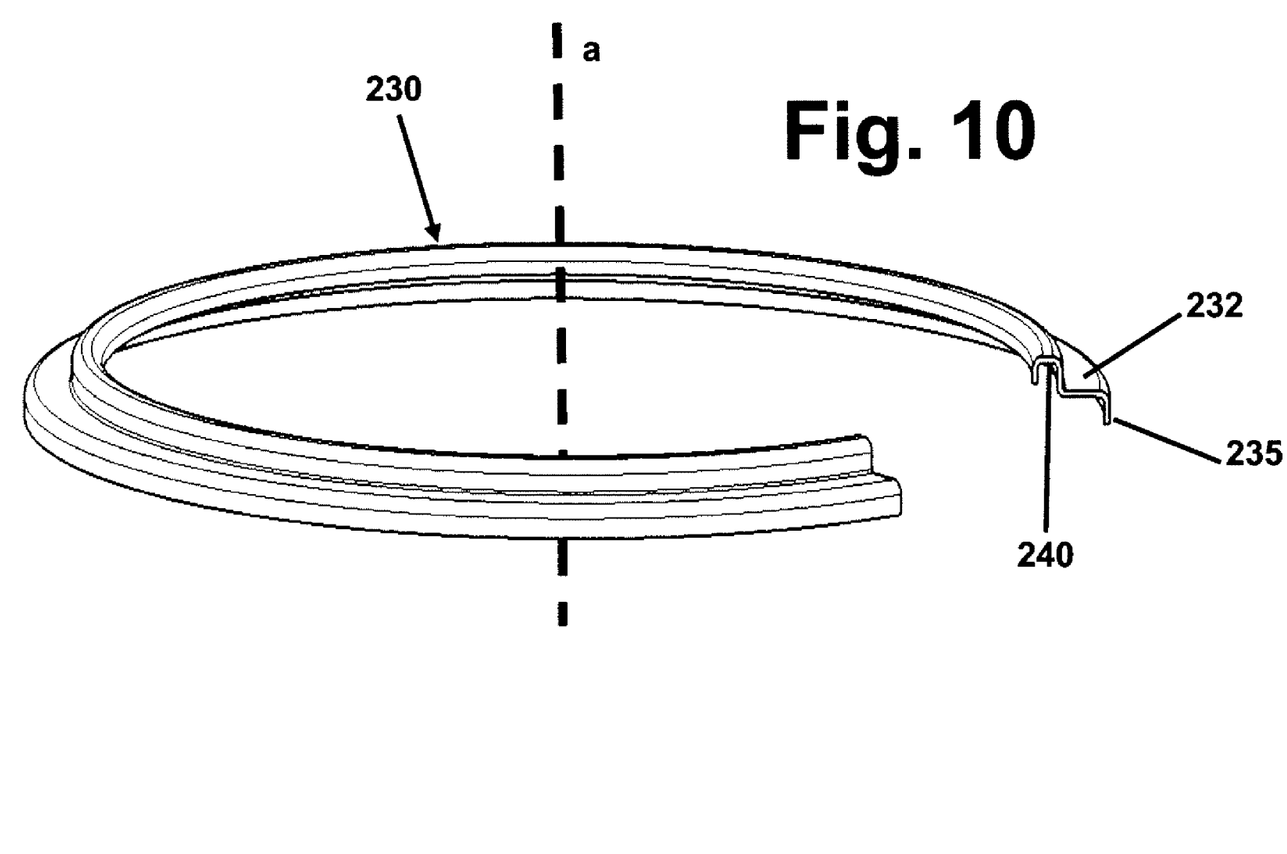
FIG. 10 is a fragmentary perspective view of the retainer incorporated into the turbocharger of FIGS. 8 and 9, the retainer being isolated from the turbocharger for clarity.

Referring to FIGS. 8-10, in some embodiments, the cartridge assembly 112 can be retained between the turbine housing 108 and the center housing 102 by being compressed between a flange 128 and a retainer 230 that is configured in accordance with another exemplary embodiment. The retainer 230 can include an annular body 232 generally defining a central axis a. A lip 235 configured to engage the center housing 102 can be disposed around a perimeter of the annular body 232. For example, a substantially annular protrusion 101 can extend from the center housing 102 and the lip 235 can be configured to abut the protrusion. A concave portion 240 can extend from the annular body 232, for example, from an inner perimeter of the annular body, and can be configured to act as a spring when the retainer 230 is mechanically loaded in a direction having a component parallel to a.

Figure 3:
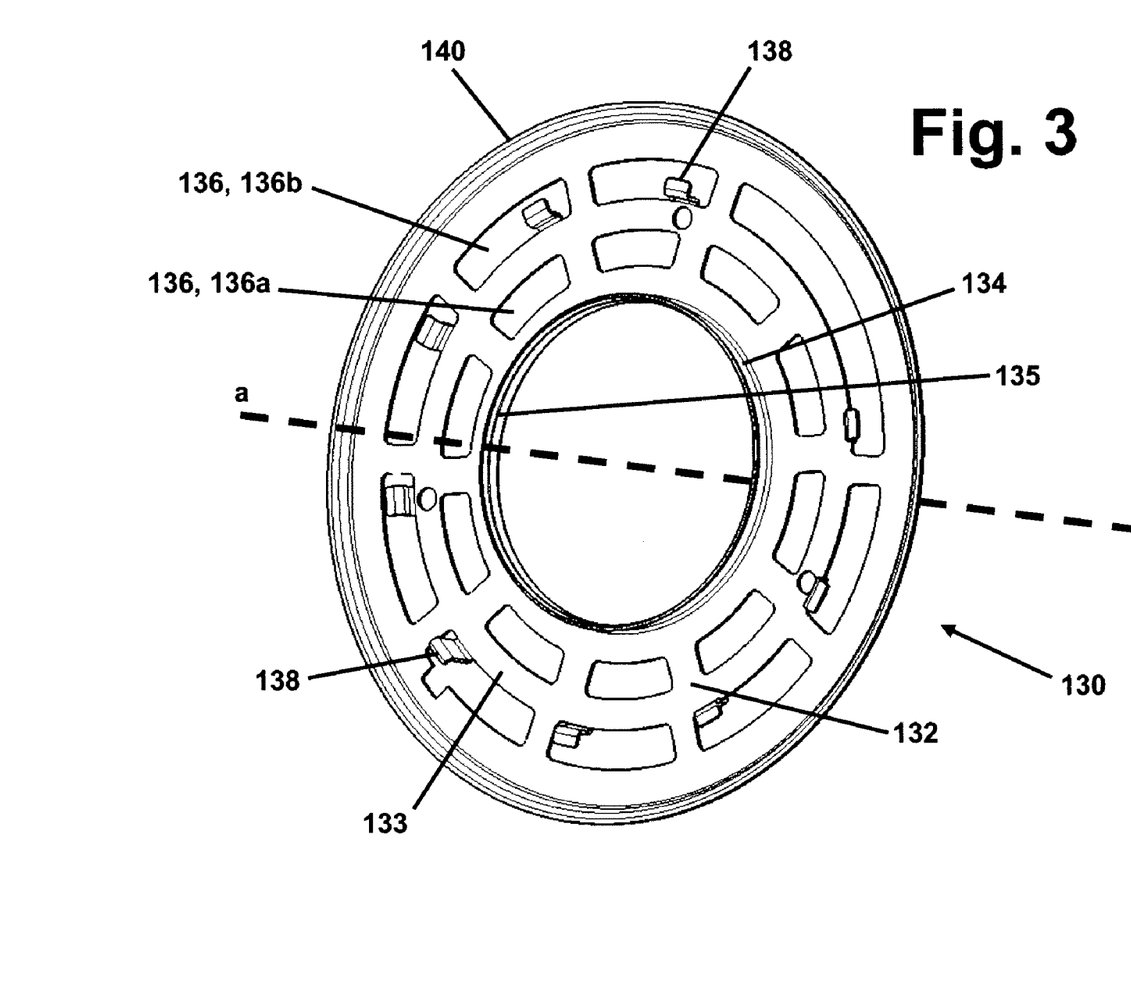
FIG. 3 is a perspective view of the retainer incorporated into the turbocharger of FIGS. 1 and 2, the retainer being isolated from the turbocharger for clarity.
Figure 4:
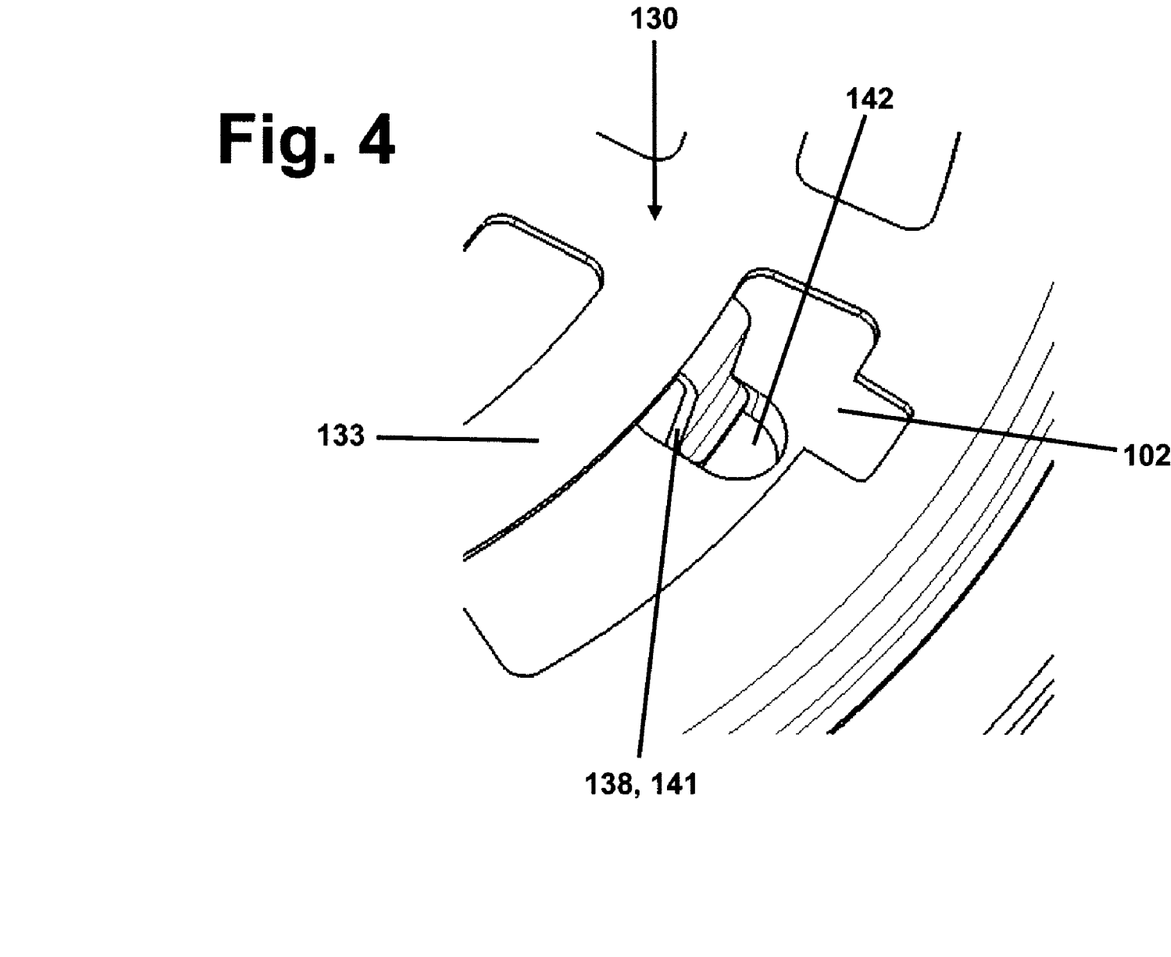
FIG. 4 is a magnified perspective view of the center housing and retainer incorporated into the turbocharger of FIGS. 1 and 2, showing the depression defined by the center housing.
Figure 5:
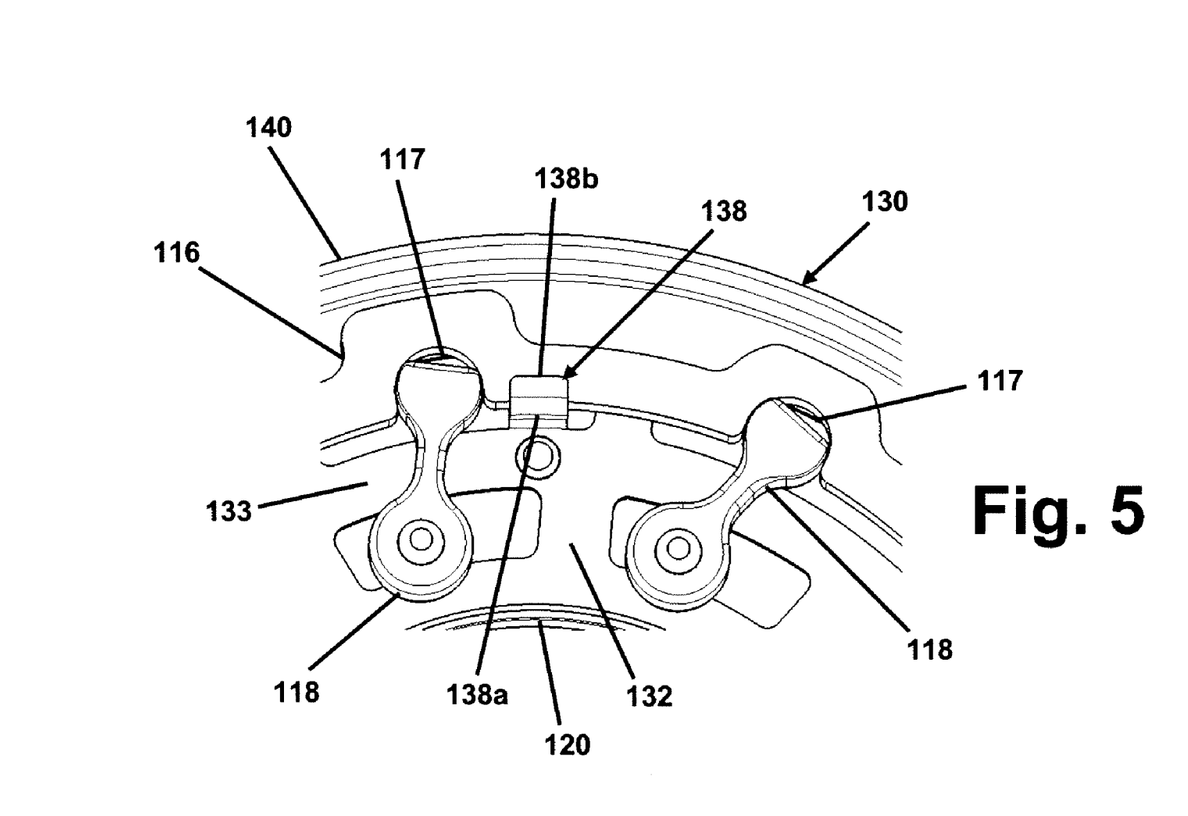
FIG. 5 is a magnified perspective view of the area 5-5 of FIG. 2, showing the shape of the legs and the concavities defined by the unison ring.
Figure 6:
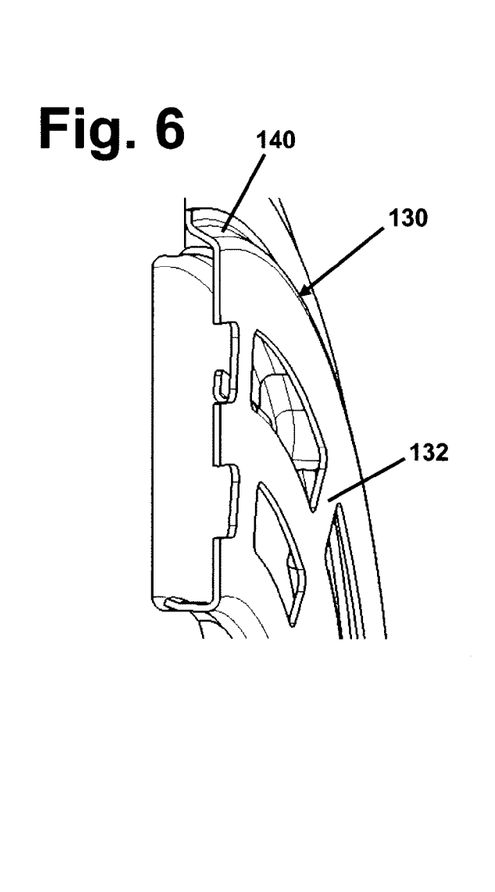
FIGS. 6 and 7 are fragmentary perspective and cross-sectional views of the retainer and center housing incorporated into the turbocharger of FIGS. 1 and 2, showing a concave portion of the retainer.
Figure 7:
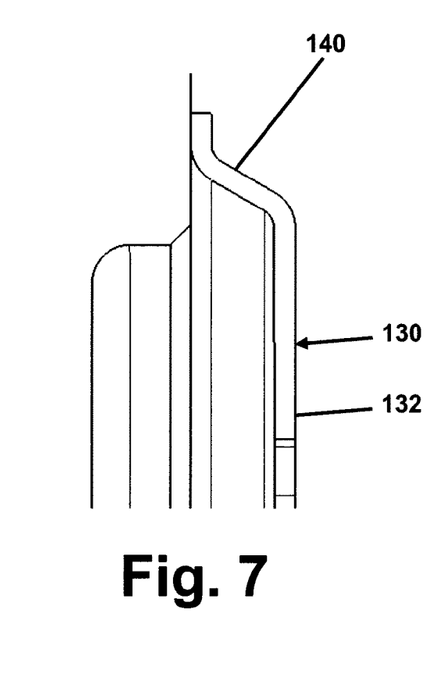

In some embodiments, the retainer 230 may exclude legs, such as the legs 138 of the retainer 130 (FIG. 3). In such case, the assembly cartridge 112 may be laterally located though a coupling of a component of the assembly cartridge, such as the nozzle ring 120, and the nose 103 (FIG. 1) of the center housing 102. Alternatively, the nozzle ring 120 may define an annular ridge 119 that extends around the first surface 121 of the nozzle ring, with the flange 128 abutting the ridge in order to maintain the lateral position of the assembly cartridge 112. As still another alternative, the lateral position of the assembly cartridge 112 may be maintained via a frictional coupling between the first surface 121 of the nozzle ring 120 and the flange 128 and between the second surface 123 of the nozzle ring and the retainer 230.

As mentioned above, the concave portion 140, 240, perhaps in conjunction with the body 132, can be configured to act as a spring when the retainer is mechanically loaded in a direction having a component parallel to a. As such, the retainer 130, 230 may serve to urge the cartridge assembly 112 towards the turbine housing 108. In some embodiments, the retainer 130, 230 may serve to locate the cartridge assembly 112 within the turbocharger 100 while allowing the cartridge assembly to remain mechanically independent of either of the center housing 102 or the turbine housing 108, that is, avoiding rigid mechanical coupling between the cartridge assembly and either of the center housing or the turbine housing.

Many modifications and other embodiments of the inventions set forth herein will come to mind to one skilled in the art to which these inventions pertain having the benefit of the teachings presented in the foregoing descriptions and the associated drawings. For example, while the previously described embodiments invoke a centrifugal compressor, various types of compressors may be configured consistently with the present disclosure. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A retainer for a turbocharger, said retainer comprising:
   a generally annular body defining a bore that is generally directed along a central axis of said body and configured to mate with a nose of a center housing of a turbocharger and further defining one or more channels configured to accommodate vanes associated with a cartridge assembly of the turbocharger; and
   one or more legs extending from said retainer body and configured to mate with and locate said retainer relative to a cartridge assembly for the turbocharger.

2. A retainer according to claim 1, wherein said one or more legs extend from said retainer in an overall direction that has a component substantially parallel to the central axis and has a component substantially perpendicular to the central axis.

3. A retainer according to claim 2, wherein the one or more channels are dispersed circumferentially around said retainer and each of the one or more channels extends through said retainer substantially parallel to the central axis.

4. A retainer according to claim 3, wherein each of said one or more legs is disposed at approximately the same radius with respect to the central axis.

5. A retainer according to claim 1, wherein the channels include a first set of one or more channels circumferentially disposed at a first radius relative to the central axis and a second set of one or more channels circumferentially disposed at a second radius that is larger than the first radius.

6. A retainer according to claim 5, wherein said legs extend from a portion of said retainer disposed between the first and second sets of channels and in a direction toward the second set of one or more channels.

7. A retainer according to claim 1, wherein said one or more legs includes one or more arcuate legs configured to retain a unison ring of a cartridge assembly of a turbocharger.

8. A retainer according to claim 7, wherein each of said one or more arcuate legs includes adjacent first and second leg portions, said first leg portion extending substantially parallel to the central axis and said second leg portion extending substantially perpendicular to the central axis.

9. A retainer according to claim 7, wherein said one or more arcuate legs are disposed around said retainer body and configured so as to allow said one or more arcuate legs to pass through concavities defined by the unison ring.

10. A retainer according to claim 1, further comprising a concave portion disposed around a perimeter of said body such that said body and said concave portion are together configured to act as a spring when said retainer is mechanically loaded in a direction having a component parallel to the central axis.

11. A retainer according to claim 1, further comprising an alignment protrusion extending from said retainer at least partially substantially parallel to the central axis.

12. A retainer according to claim 11, wherein one of said one or more legs serves as said alignment protrusion.

13. A retainer for a turbocharger, said retainer comprising:
   an annular body generally defining a central axis, the annular body being planar and oriented such that the central axis is normal to the planar annular body;
   a concave portion extending radially inwardly from a radially inner edge of said annular body and extending in a direction parallel to the central axis and configured to act as a spring when said retainer is mechanically loaded in a direction having a component parallel to the central axis; and
   a lip extending from a radially outer edge of said annular body and extending in a direction parallel to the central axis and configured to engage a center housing of the turbocharger.

14. A turbocharger having a variable-nozzle turbine, said turbocharger comprising:
   a center housing including a nose;
   a turbine housing configured to house a turbine wheel and connected to said center housing; and
   a cartridge assembly retained between said center housing and said turbine housing, said cartridge assembly comprising:
      a generally annular nozzle ring having opposing first and second surfaces and coupled to an array of vanes circumferentially spaced about the nozzle ring such that exhaust gas flows between the vanes to the turbine wheel, each vane being rotatably mounted to the nozzle ring and connected to a rotatable unison ring via a vane arm such that rotation of the unison ring rotates the vanes for regulating exhaust gas flow to the turbine wheel;
      a substantially annular flange having a radially inner portion and a radially outer portion, the radially inner portion being adjacent to the first surface of said nozzle ring; and
      a retainer including
         a generally annular body defining a bore that is generally directed along a central axis of said body, a radially inner surface of the bore engaging said nose so as to locate said retainer radially with respect to said center housing, and further defining one or more channels configured to accommodate said vanes, said body being disposed between said vanes and said unison ring such that said vanes extend through the one or more channels to couple to said vane arms; and
         one or more legs extending from said body and configured to engage said unison ring to locate said retainer relative to said unison ring.

15. A turbocharger according to claim 14, wherein each of said one or more legs is disposed at approximately the same radius with respect to the central axis and said center housing defines a depression that accommodates at least one of said one or more legs.

16. A turbocharger according to claim 14, wherein said retainer further comprises a concave portion disposed around a perimeter of said body and said turbine housing is connected to said center housing so as to compress therebetween said retainer and said nozzle ring such that said body and concave portion together act as a spring in urging said nozzle ring toward said turbine housing.

17. A turbocharger according to claim 14, wherein said one or more legs extend from said retainer in an overall direction that has a component substantially parallel to the central axis and has a component substantially perpendicular to the central axis.

18. A turbocharger according to claim 14, wherein said one or more legs includes one or more arcuate legs configured to retain said unison ring.

19. A turbocharger according to claim 18, wherein each of said one or more arcuate legs includes adjacent first and second leg portions, said first leg portion extending substantially parallel to the central axis and said second leg portion extending substantially perpendicular to the central axis.

20. A turbocharger according to claim 18, wherein said one or more arcuate legs are disposed around said retainer body and configured so as to allow said one or more arcuate legs to pass through concavities defined by said unison ring.

21. A turbocharger according to claim 14, wherein said cartridge assembly is mechanically independent of said center housing and said turbine housing.

22. A turbocharger having a variable-nozzle turbine, said turbocharger comprising:
- a center housing;
- a turbine housing configured to house a turbine wheel and connected to said center housing; and
- a cartridge assembly retained between said center housing and said turbine housing, said cartridge assembly comprising:
  - a generally annular nozzle ring having opposing first and second surfaces and coupled to an array of rotatable vanes configured to regulate exhaust gas flow to the turbine wheel;
  - a substantially annular flange having a radially inner portion and a radially outer portion, the radially inner portion being adjacent to the first surface of said nozzle ring; and
  - a retainer including
    - an annular body generally defining a central axis;
    - a concave portion extending from said annular body and disposed adjacent to the second surface of said nozzle ring in an area opposite the radially inner portion of said flange; and
    - a lip disposed around a perimeter of said annular body and configured to engage said center housing,
  wherein said turbine housing is connected to said center housing so as to compress therebetween said annular body and the radially outer portion of said flange, said nozzle ring being compressed between the radially inner portion of said flange and said concave portion, said concave portion acting as a spring in urging said nozzle ring against said radially inner portion of said flange.

23. A turbocharger according to claim 22, wherein said nozzle ring defines an annular recess and said annular flange sits in the annular recess.

24. A turbocharger according to claim 22, wherein said cartridge assembly is mechanically independent of said center housing and said turbine housing.

* * * * *